Dec. 7, 1926.
R. THUILLANT
1,609,503
PROJECTION APPARATUS
Filed Dec. 29, 1923    3 Sheets-Sheet 1
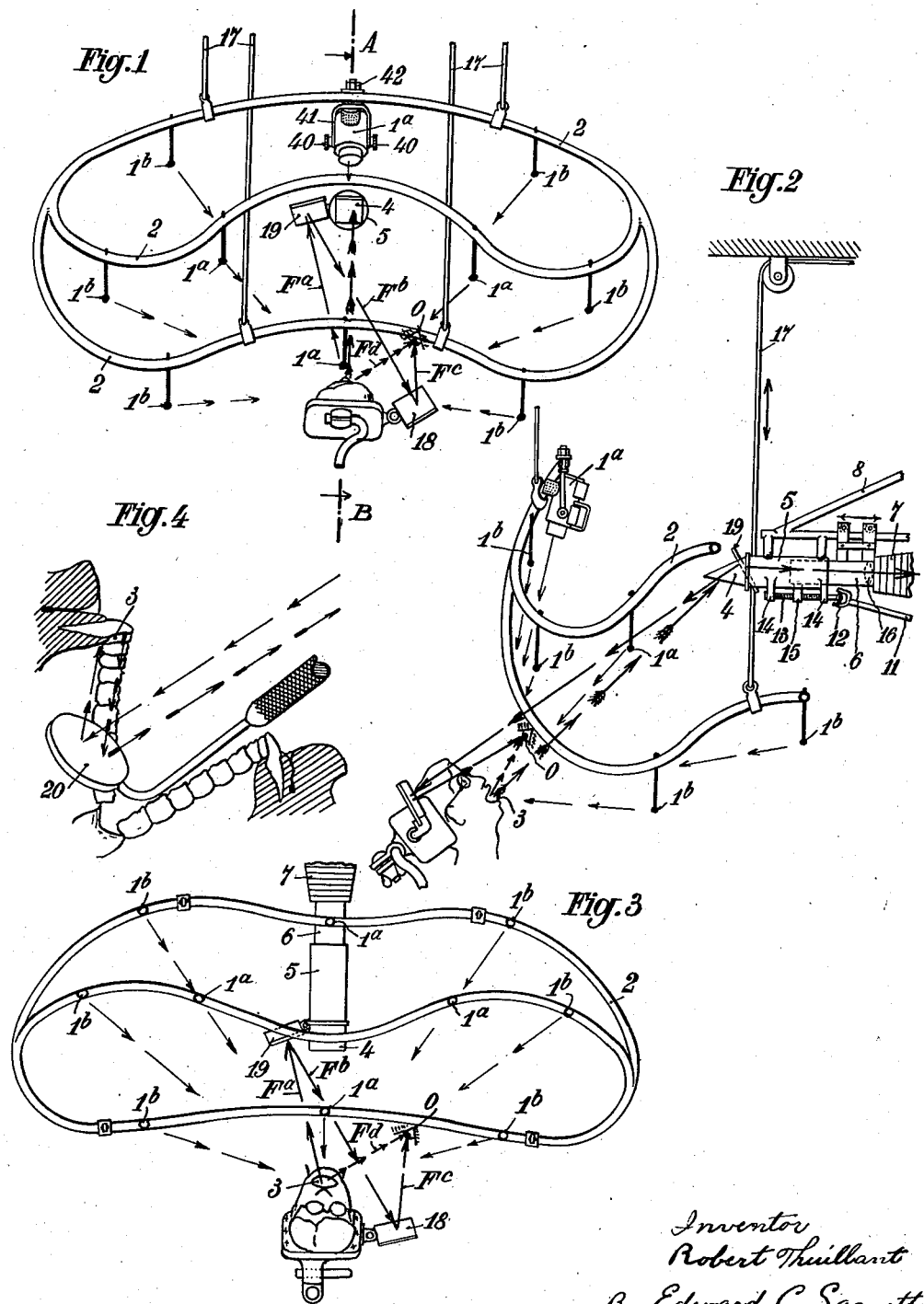

Dec. 7, 1926.                                                   1,609,503
R. THUILLANT
PROJECTION APPARATUS
Filed Dec. 29, 1923          3 Sheets-Sheet 2
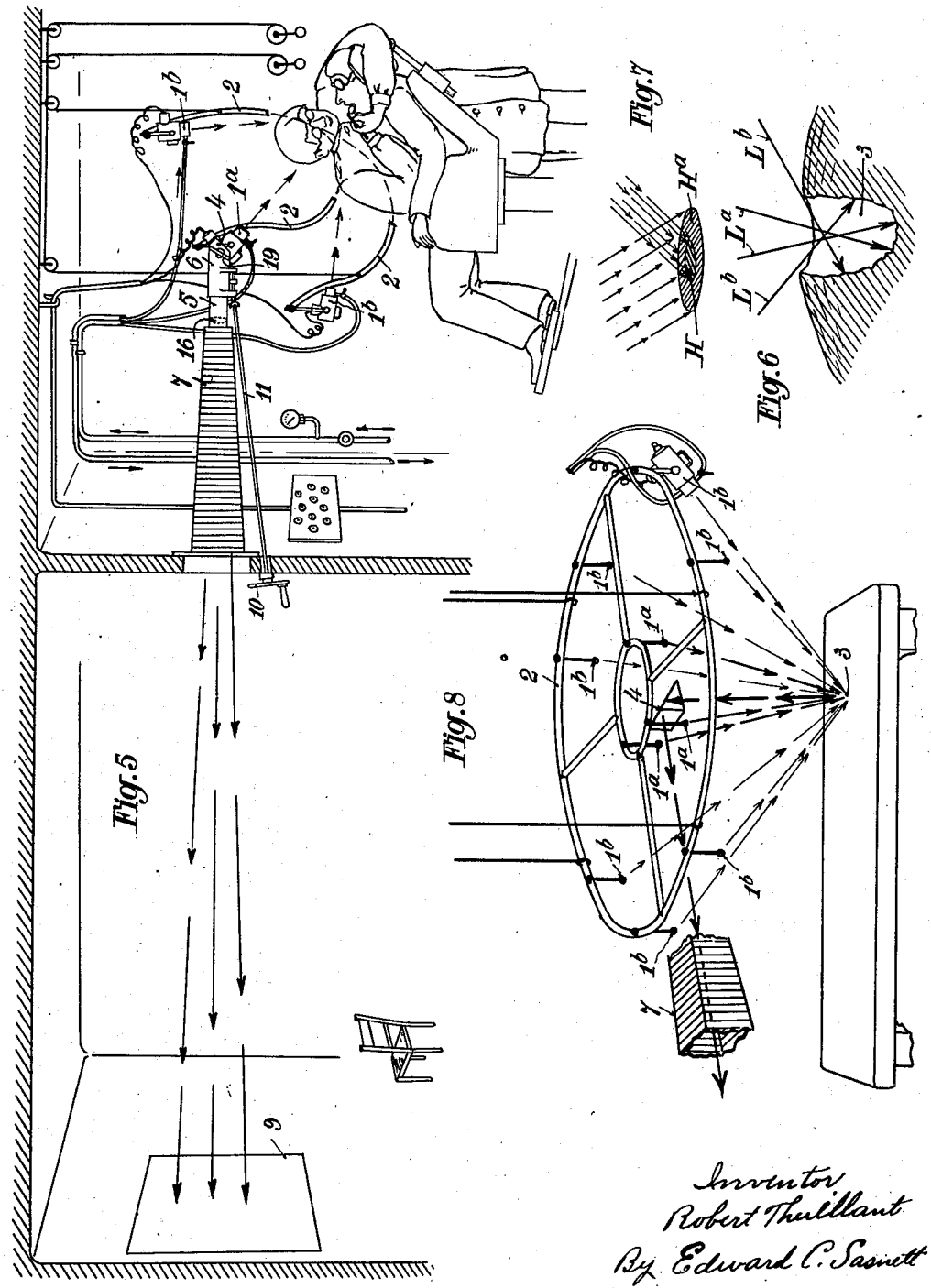

Dec. 7, 1926.
R. THUILLANT
PROJECTION APPARATUS
Filed Dec. 29, 1923
1,609,503
3 Sheets-Sheet 3

Inventor
Robert Thuillant
By Edward C. Sasnett
Attorney,

Patented Dec. 7, 1926.

1,609,503

UNITED STATES PATENT OFFICE.

ROBERT THUILLANT, OF PARIS, FRANCE.

PROJECTION APPARATUS.

Application filed December 29, 1923. Serial No. 683,341.

The present invention relates to projection apparatus, and particularly to apparatus adapted to project on a screen located in one room the image of an object located in another room. The invention has for its general object to provide a projection apparatus suitable for exhibiting surgical operations on an enlarged scale and with a clear well defined image of the object operated on. To this end the invention comprises a novel system of lights for illuminating all parts of the subject in combination with suitable mirrors and prisms for directing the light beams. Other objects and advantages of the invention will be set forth hereinafter, and the novel features will be particularly pointed out in the claims.

Referring to the accompanying drawings:

Fig. 1 is a view in elevation of an apparatus embodying the invention, illustrating the use of the apparatus in projecting a dental operation;

Fig. 2 is a vertical section on the line A—B of Fig. 1;

Fig. 3 is a plan view;

Fig. 4 is a detail view showing the path of a beam entering the mouth of a patient;

Fig. 5 is a view in elevation of the apparatus as a whole, parts being shown diagrammatically;

Figs. 6 and 7 are detail views further illustrating the path of the light beams;

Fig. 8 is a view in perspective of a modified form of the apparatus;

Figure 10:
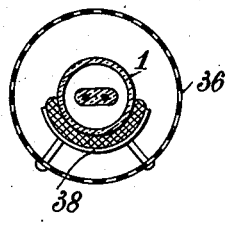
Fig. 10 is a section on the line C—D of Fig. 9.

Referring to the drawings, the apparatus comprises a plurality of electric incandescent or arc lamps $1^a$ and $1^b$ mounted on a tubular metal support 2 of the form shown. The lamps are mounted on the support 2 and distributed so as to illuminate most advantageously the study zone 3, which as shown in Figs. 3, 4 and 6, is the mouth of a patient undergoing a dental operation. The lamps $1^a$ are distributed inwardly of the lamps $1^b$, but the form of the support is such that all of the lamps are located at substantially the same distance from the zone to be lighted and projected.

Supported centrally of the support is a pair of telescoping tubes 5 and 6. A prism 4 is mounted in tube 5 and an objective 16 is mounted in tube 6. A bellows 7 is attached at one end to tube 5 and is secured at its other end over an aperture in the partition separating the operating room from the exhibiting room. As indicated in Fig. 2 the bellows and telescoping tubes may be supported by a bracket 8 adapted to be secured to the wall of the operating room. The focussing of the image on the screen 9 may be effected by operating a hand wheel 10 in the exhibiting room. This wheel is attached to the end of a shaft 11, which is connected at its other end to a threaded shaft 13 by a universal joint 12. The threaded shaft 13 is rotatable in lugs 14 on tube 5 and has threaded engagement with a lug 15 on tube 6, whereby rotation of shaft 13 moves tube 6 relatively to tube 5, a longitudinal slot being provided in tube 5, through which lug 15 projects.

The height of support 2 may be controlled by ropes 17, which are secured to said support and pass through rings, or around pulleys secured to the ceiling of the operating room. The lamps are supported, as hereinafter described, so that they may be given any desired orientation with respect to the support for the purpose of converging the rays therefrom on the zone to be projected. As diagrammatically illustrated in Fig. 6, the rays from lamps $1^a$, located centrally of the support, follow generally the lines $L^a$, while the rays from lamps $1^b$, located near the edges of the support follow the lines $L^b$. Thus if the object to be projected is a recess, for example the cavity in a tooth, the light rays strike all portions of the wall of the cavity and accordingly the entire cavity is projected on the screen clearly.

If, for example, in the case of dental surgery, the part to be projected is at the front teeth, the light rays from the lamps converge upon the part to be projected directly and are reflected therefrom through the prism 4, by which they are refracted and pass through the bellows to the screen 9, by which the image of the object is exhibited to students in the screen room.

Means are provided to enable the operator to observe at a glance whether or not the patient, or object to be projected, is in proper position with respect to the projection apparatus. For this purpose mirrors 18 and 19 are universally mounted respectively adjacent the patient and the prism 4. Preferably the mirror 18 is mounted at the right hand side of the patient, while the mirror 19 is mounted at the left hand side of the prism. The operator can thus observe the object directly, as indicated by the line F$^d$, and simultaneously the image of the object reflected by mirrors 19 and 18 along the lines F$^a$, F$^b$ and F$^c$. Thus without moving the operator can determine at a glance whether or not the patient is in correct position.

Fig. 4 indicates a method of projecting a zone located at the back of the teeth. In this method, the rays coming from the lamps are reflected by a hand mirror 20 to the zone to be projected and the rays reflected from said zone are again reflected by the mirror 20 to the prism 4 and the mirror 19.

As indicated in Fig. 7, the light rays from the lamps can be so directed that the rays from some of the lamps are concentrated on a small field H, while the rays from other lamps are distributed over a relatively large field H$^a$ which includes the field H. In this manner a particular part of the object can be illuminated and exhibited with relatively great brilliance.

Figure 9:
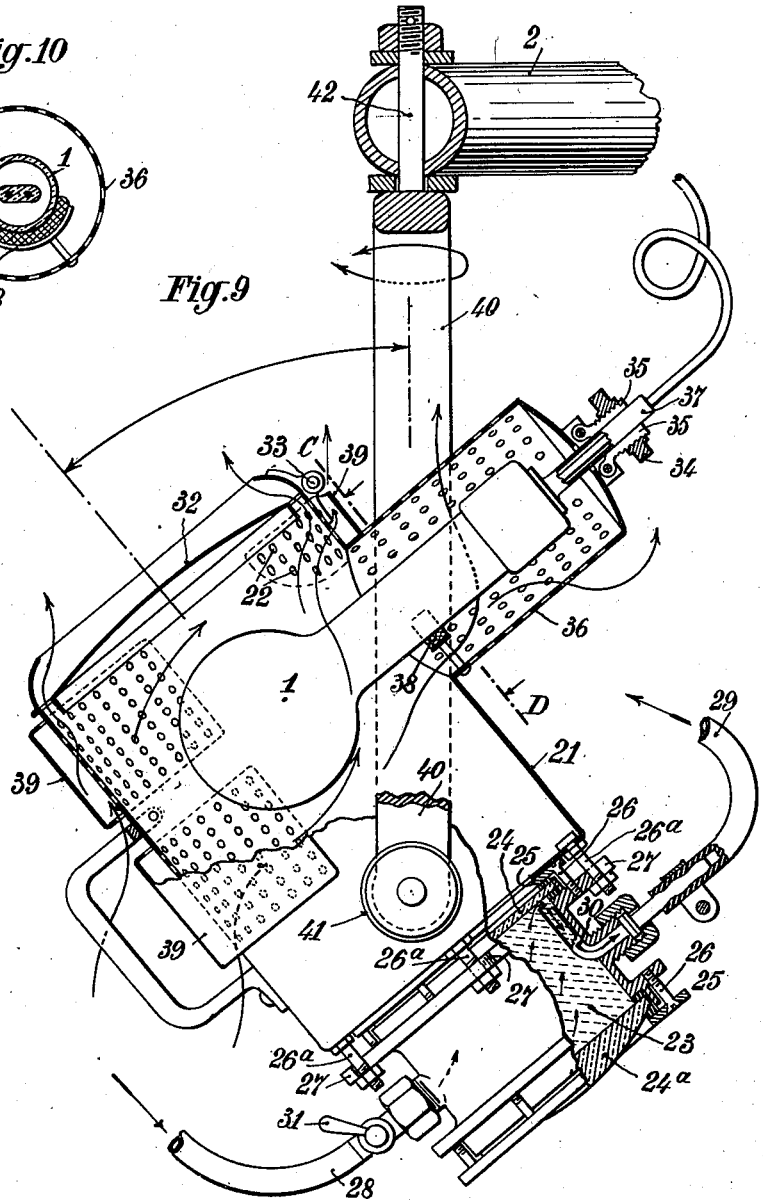
Fig. 9 is a sectional view of one of the lamp housings and the supporting means therefor.

As illustrated particularly in Figs. 9 and 10, the lamps are supported in adjustable water-cooled housings. Each lamp 1 is supported in a housing 21 formed with perforations 22 for enabling a free circulation of air through the housing. Shields 39 are mounted over the perforations to intercept the light rays which might otherwise interfere with the proper projection of the object. The housing is formed with a perforated tubular portion 36 for accommodating the stem of lamp 1, which stem is supported by an asbestos stirrup 38. A small stem 37 rigid with the lamp passes through an aperture in the top of portion 36 and is frictionally engaged by pivoted jaws 35, which have threaded engagement with a nut 34. The jaws 35 are tapered, so that by screwing the nut in or out the stem 37 is clamped and unclamped.

The rear end of the housing is closed by a cover 32 hinged at 33, whereby the lamp may be removed for replacement. The front end of the housing is closed by a water cooled chamber including a lens. This chamber includes a cylindrical member which is secured to the housing by bolts 26$^a$ passing through a flange 27 on the cylindrical member. The rear wall of the chamber consists of a glass pane 24 held between suitable gaskets and clamped between the cylindrical member and a ring 25 fastened to the housing. The front wall of the chamber consists of a lens 24$^a$ mounted in suitable gaskets and clamped between a ring 25 and a flange on the cylindrical member by means of bolts 26. Water is supplied to the chamber through a pipe 28 and is discharged therefrom through a pipe 29, the latter communicating with a tube 30 having a restricted opening in the chamber at the highest part thereof, so that when water is admitted through the pipe 28, the air in the chamber will be completely displaced when the chamber is filled. After the chamber is filled, a valve 31 in the admission pipe may be operated to adjust the opening therethrough to approximately the same cross section as that of the restricted opening of tube 30.

The lamp housing is supported in a stirrup 40, which is swivelly mounted on the support 2 by means of a bolt 42. The housing is adapted to be clamped in any angular position in the stirrup by clamping bolts 41 provided with milled heads. Thus the lamps are mounted for movement in vertical planes about the axis of bolts 41 and for movement in horizontal planes about the axis of bolts 42.

The modified apparatus shown in Fig. 8 is adapted for the projection of the image of an object horizontally located, the operating principles of this apparatus being substantially the same as in the apparatus previously described.

What I claim is:

1. Projection apparatus of the kind described comprising screen and object rooms separated by a partition having an aperture, a screen in the screen room opposite the aperture, a bellows in the object room secured over the aperture, telescoping tubes secured to the free end of the bellows, a lens in the inner tube and a prism in the outer tube, means for focussing the image of the object on the screen comprising a screw rotatable but longitudinally fixed with respect to the outer tube and engaging screw threads in a member rigid with the inner tube, a rod having a universal connection with the screw and journaled in the partition and a hand wheel in the screen room on the end of the rod, and a number of light sources in the object room arranged at widely different angles with respect to the object to be projected.

2. Projection apparatus of the kind described comprising a screen room and an object room separated by a partition having an aperture, a screen opposite the aperture, an elongated enclosure in the object room secured over the aperture, a tube projecting from the free end of said enclosure, an outer tube telescoping therewith, a prism and a lens in the outer and inner tubes respectively, mechanism for relatively adjusting said tubes comprising a manually operable member located in the screen room, and a number of lights in the object room arranged to direct beams at different angles on the object to be projected.

3. In projection apparatus of the kind described, means for projecting the image of an object located in a projection room comprising a tubular structure secured over an aperture in a wall of the projection room and provided with a lens and a prism adjacent its free end, a vertically adjustable lamp support in the projection room, a plurality of lamps mounted on said support for angular adjustment adapted to direct rays at different angles on the object, an adjustable mirror mounted adjacent said prism and an adjustable mirror mounted adjacent to and at one side of the object, whereby the operator can observe from one point the object directly and the image of the object reflected by said mirrors and can thus determine the correct position of the object with respect to the prism.

4. In projection apparatus of the kind described, in combination, means for illuminating the object to be projected comprising a plurality of lamps distributed in the projection room at various angular positions with respect to the object to be projected, each of said lamps comprising a casing having an opening, a bulb mounted in the casing opposite the opening, a tubular extension concentric with the opening, a glass disk clamped between the casing and extension, a lens secured in the outer end of the extension, the space between the disk and lens constituting a water chamber, a pipe opening into the lower side of the chamber for introducing cold water, a tube opening into the upper part of the chamber connected to a discharge pipe, the opening of the tube being substantially smaller than the opening of the pipe, for the purpose described.

5. In projection apparatus of the kind described, a lamp comprising a housing supported in a downwardly inclined position, having a main chamber and a chamber extending substantially at right angles to the main chamber, a lens mounted in the main chamber of the housing at the lower end thereof, a stirrup fixed in the angularly disposed chamber, a bulb in the main chamber opposite the lens having an extension resting on said stirrup, a stem projecting from the end of the bulb extension and passing through the top of the angularly disposed chamber, releasable means for clamping the stem, the walls of said chambers being perforated for free circulation of air, and shields over the perforations in the lower sides of the main chamber walls to intercept the downwardly directed rays of light.

6. In projection apparatus of the kind described, a lamp comprising a housing supported in a downwardly inclined position, having a main chamber and a chamber extending upwardly substantially at right angles to the main chamber, a lens mounted in the main chamber of the housing at the lower end thereof, a glass disk spaced from the lens, means for circulating a cooling medium through the space between the lens and disk, a stirrup fixed in the angularly disposed chamber, a bulb in the main chamber having an extension resting on said bulb, a stem projecting from the end of the bulb extension through an opening in the top of the angularly disposed chamber, releasable means mounted on said top for holding the stem, and a hinged cover for the upper end of said main chamber.

In testimony whereof I hereunto affix my signature.

ROBERT THUILLANT.